US012614870B2

(12) United States Patent
Tasaka et al.

(10) Patent No.: US 12,614,870 B2
(45) Date of Patent: Apr. 28, 2026

(54) CONNECTOR CONFIGURED TO TAKE A PRIMARY LOCKING STATE AND A SECONDARY LOCKING STATE

(71) Applicant: JAPAN AVIATION ELECTRONICS INDUSTRY, LIMITED, Tokyo (JP)

(72) Inventors: Shunsuke Tasaka, Tokyo (JP); Yoshinobu Yamamoto, Tokyo (JP); Rintaro Kato, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 273 days.

(21) Appl. No.: 18/380,408

(22) Filed: Oct. 16, 2023

(65) Prior Publication Data

US 2024/0170880 A1 May 23, 2024

(30) Foreign Application Priority Data

Nov. 22, 2022 (JP) ................................ 2022-186540

(51) Int. Cl.
*H01R 13/436* (2006.01)
*H01R 13/422* (2006.01)

(52) U.S. Cl.
CPC ..... *H01R 13/4362* (2013.01); *H01R 13/4223* (2013.01); *H01R 13/4361* (2013.01)

(58) Field of Classification Search
CPC ........................ H01R 13/4362; H01R 13/4361
USPC ......................................................... 439/752
See application file for complete search history.

(56) References Cited

U.S. PATENT DOCUMENTS 5,252,096 A * 10/1993 Okada ................ H01R 13/4362 439/752
5,378,176 A * 1/1995 Sasai .................. H01R 13/4362 439/752
8,795,000 B2 * 8/2014 Sugimoto .......... H01R 13/4364 439/752
2006/0141872 A1 * 6/2006 Yamakado ......... H01R 13/4362 439/751
2012/0289090 A1 * 11/2012 Oiri ........................ H01R 43/22 439/625

(Continued)

FOREIGN PATENT DOCUMENTS

JP 2000-268915 A 9/2000
WO WO-2011073128 A1 * 6/2011 ......... H01R 13/4362

*Primary Examiner* — Marcus E Harcum
(74) *Attorney, Agent, or Firm* — Greenblum & Bernstein, P.L.C.

(57) ABSTRACT

A connector includes: terminal that includes a box-like portion, into which a mating terminal is inserted; a housing that has an accommodating hole accommodating the box-like portion; and a retainer that is attached to the housing in a manner to be displaceable in a crossing direction, which crosses with a direction in which the box-like portion is inserted. A pressing piece is formed on an upper surface of the accommodating hole, and a protrusion is formed on the lower surface. The retainer includes a protrusion portion. When the retainer is positioned on the first position, the box-like portion is allowed to be inserted into the accommodating hole and the portion is pushed by the pressing piece and displaced in the crossing direction so as to make a step portion of the box-like portion be retained and a rear end of the box-like portion be retained, producing a primary locking state.

4 Claims, 13 Drawing Sheets

(56) References Cited

U.S. PATENT DOCUMENTS

| | | | | |
|---|---|---|---|---|
| 2013/0303015 | A1* | 11/2013 | Oka | H01R 9/0518 439/374 |
| 2019/0089082 | A1* | 3/2019 | Hayashi | H01R 13/187 |
| 2020/0313353 | A1* | 10/2020 | Kanemura | H01R 13/629 |
| 2022/0131302 | A1* | 4/2022 | Iwasaki | H01R 13/629 |
| 2022/0352668 | A1* | 11/2022 | Sekino | H01R 13/631 |
| 2023/0198191 | A1* | 6/2023 | Tsuchiya | H01R 13/4223 439/701 |
| 2024/0356262 | A1* | 10/2024 | Miyamura | H01R 13/7193 |

* cited by examiner 10
11
13
12
32
14
30
15
21
36
20

21a 80
40
46
75
E
63
60
73
74
40a
76
64
40b
61
F
47
67
40d

CONNECTOR CONFIGURED TO TAKE A PRIMARY LOCKING STATE AND A SECONDARY LOCKING STATE

TECHNICAL FIELD

The present invention relates to a connector configured to take two states which are a primary locking state in which a terminal is temporarily locked and a secondary locking state in which the terminal is finally locked.

BACKGROUND ART

FIG. 1 illustrates a configuration of a connector that is described in Japanese Patent Application Laid Open No. 2000-268915 as a related art of the above-mentioned kind of connector. In FIG. 1, the connector is shown as a sectional view in an exploded state.

A connector housing 10 includes a cavity 11 into which a female terminal fitting 30 can be inserted from the rear side, and an insertion hole 13, into which a tab of a male terminal fitting of a counterpart is inserted, is formed on a front face wall 12 which is on a front end portion of the cavity 11. A front half portion of the cavity 11 is formed in a size that allows the terminal fitting 30 to be displaced in a direction orthogonal to an insertion direction (upward), and a locking step portion 14 is formed on an upper portion of an inner surface of the cavity 11 in a manner to protrude downward.

A retainer attachment opening 15 is formed on a lower surface of the connector housing 10, and a retainer 20 is attached so as to cover the retainer attachment opening 15. The retainer 20 has a lance 21. The lance 21 is formed on the retainer 20 in a cantilevered state to have a free end on the front edge side, and an engagement protrusion portion 21*a* protrudes upward at an end portion of the lance 21. FIG. 1 illustrates a state in which the retainer 20 is positioned on a temporary locking position and is flush with a bottom surface of the cavity 11.

The terminal fitting 30 includes: a connection tongue portion 31; a box-shaped portion 32, which has a square tube shape surrounding the connection tongue portion 31; a wire barrel 34, which is caulked and connected to a core wire 33*a* of an electric wire 33; and an insulation barrel 35, which is caulked and fixed on an insulating film portion of the electric wire 33.

FIGS. 2(*a*) to 2(*c*) illustrate a process in which the terminal fitting 30 is inserted into the cavity 11 and shifted to a final locking position, in sequence. When the terminal fitting 30 is inserted into the cavity 11 of the connector housing 10 in a state in which the retainer 20 is positioned on a temporary locking position, an end of the terminal fitting 30 hits the engagement protrusion portion 21*a* of the retainer 20 and advances forward while bending and deforming the lance 21 downward (see FIG. 2(*a*)).

Then, when an engagement hole 36 which is formed on the bottom surface of the box-shaped portion 32 of the terminal fitting 30 aligns with the engagement protrusion portion 21*a*, the engagement protrusion portion 21*a* is elastically restored to be engaged with the engagement hole 36 and the terminal fitting 30 is held by the retainer 20 (see FIG. 2(*b*)).

Subsequently, when the retainer 20 is pushed from the temporary locking position to the final locking position, the terminal fitting 30 is translated upward in the cavity 11 to a position where a rear edge portion of the box-shaped portion 32 of the terminal fitting 30 is engaged with the locking step portion 14 on the upper surface of the cavity 11 (see FIG. 2(*c*)). In this state, the terminal fitting 30 is retained by the lance 21 of the retainer and the box-shaped portion 32 is abutted to be retained by the locking step portion 14 in the cavity 11. Thus, a double locking state is produced and a large holding force can be obtained.

SUMMARY OF THE INVENTION

In the conventional connector described above, a sufficient holding force can be obtained in the state in which the retainer 20 is positioned on the final locking position and the terminal fitting 30 is finally locked (secondary locking state). However, in the state in which the retainer 20 is positioned on the temporary locking position and the terminal fitting 30 is temporarily locked (primary locking state), the terminal fitting 30 is retained by the lance 21 of the retainer 20 but the terminal fitting 30 can move in the cavity 11 in a direction orthogonal to the insertion direction thereof. That is, the posture is unstable and rattling can occur. Thus, the holding force in the primary locking is not sufficient in such a configuration. For example, if the terminal fitting 30 rattles, locking by the retainer 20 may be released and the terminal fitting 30 may come off.

Especially, an assembly process of this type of connector commonly includes a work in which after inserting a terminal into a housing, an electric wire connected to the terminal is pulled so as to check whether the terminal is properly inserted and attached. In this work, if the electric wire is pulled at an angle to an axis of the terminal, that is, when the electric wire is swayed, a situation occurs in which the terminal tilts to cause release of the primary locking and the terminal easily comes off in the above-described configuration such as that of the conventional connector.

An object of the present invention is to provide a connector in which a holding force in a primary locking of a terminal is increased compared to related art and a primary locking state is maintained without allowing the terminal to come off even when, for example, an electric wire connected to the terminal is swayed in the primary locking state.

According to an embodiment of the present invention, a connector includes: a terminal that includes a box-like portion, into which a mating terminal is inserted and connected, and is attached to an end of an electric wire; a housing that has an accommodating hole accommodating the box-like portion; and a retainer that is attached to the housing in a manner to be displaceable in a crossing direction, which crosses with a direction in which the box-like portion is inserted into the accommodating hole, and can be positioned on a first position and a second position. When mutually-opposing inner surfaces of the accommodating hole are defined as an upper surface and a lower surface, a pressing piece, which cantilevers to protrude toward the lower surface, is formed on the upper surface, and a protrusion, which protrudes toward the upper surface, is formed on the lower surface. The retainer includes a protrusion portion that protrudes on extension of the accommodating hole. When the retainer is positioned on the first position, the box-like portion is allowed to be inserted into the accommodating hole and the box-like portion inserted in the accommodating hole is pushed by the pressing piece and displaced in the crossing direction so as to make a step portion, which is formed on the box-like portion, be caught by the protrusion and retained and a rear end of the box-like portion be caught by the protrusion portion and retained, where a primary locking state is produced. The retainer is displaced from the first position to the second position so as to increase hooking between the protrusion portion and the rear end of the box-like portion, where a secondary locking state is produced.

Effects of the Invention

According to the connector of the embodiment of the present invention, the primary locking state of a terminal is more stabilized than related art and the holding force in the primary locking of the terminal can be increased compared to related art. Accordingly, even when, for example, an electric wire connected to a terminal is pulled or swayed in the primary locking state, release of the primary locking can be prevented and the terminal can be consequently prevented from coming off.

DETAILED DESCRIPTION OF THE EMBODIMENTS

An embodiment of the present invention will be described based on an example in reference to the accompanying drawings.

Figure 1:
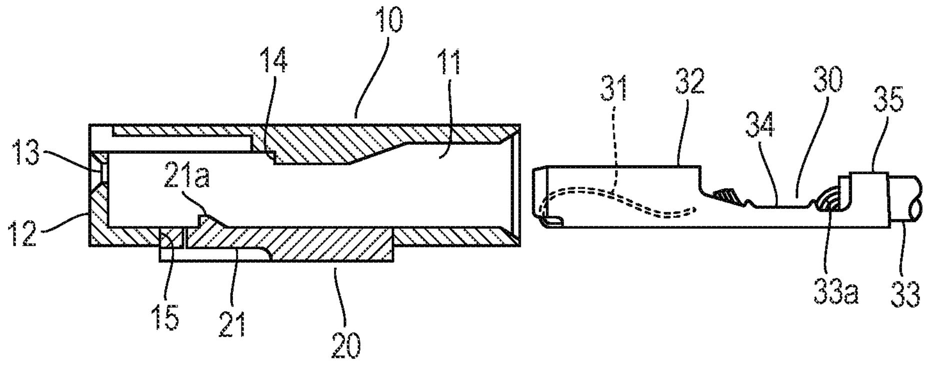
FIG. 1 PRIOR ART
FIG. 1 is a sectional view illustrating a conventional connector in an exploded state.
Figures 2A, 2B, 2C:
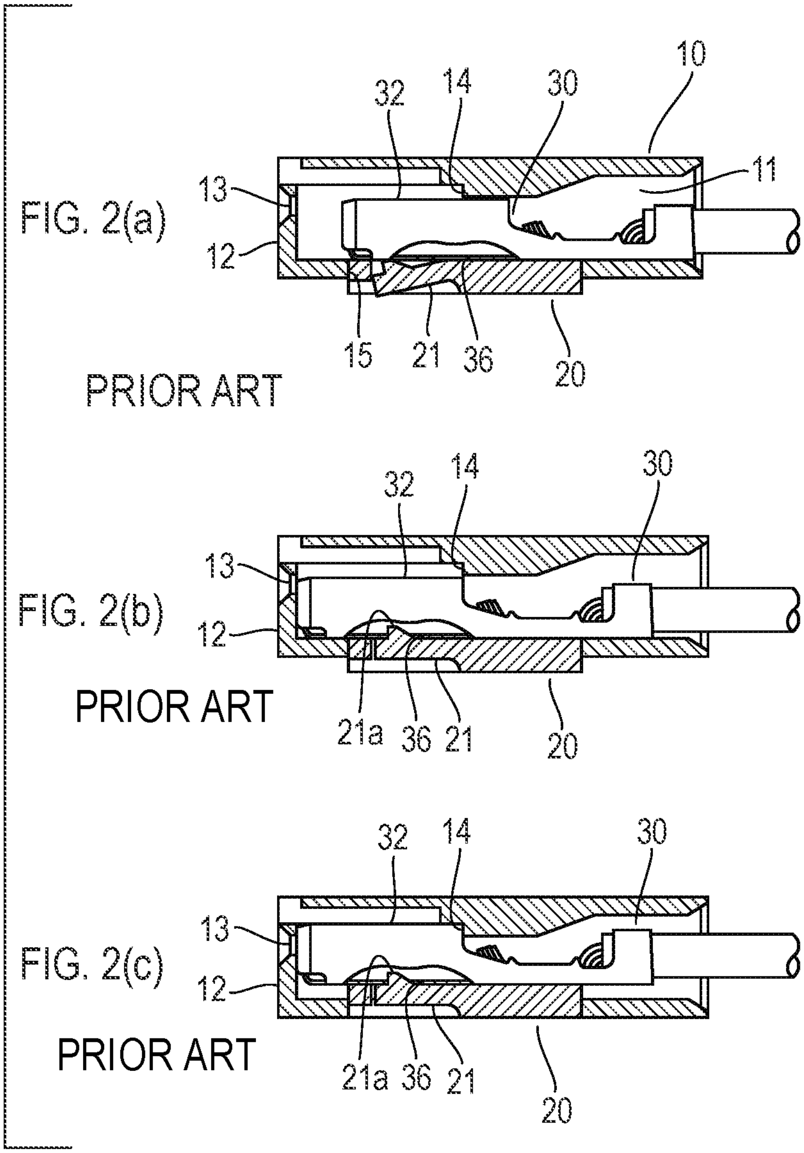
FIG. 2(a) PRIOR ART
FIG. 2(b) PRIOR ART
FIG. 2(c) PRIOR ART
FIG. 2(*a*) is a sectional view illustrating an insertion process of a terminal fitting in the connector illustrated in FIG. 1, FIG. 2(*b*) is a sectional view illustrating a state in which the terminal fitting is engaged with a lance, and FIG. 2(*c*) is a sectional view illustrating a state in which the terminal fitting is shifted to a final locking position.
Figure 3A:
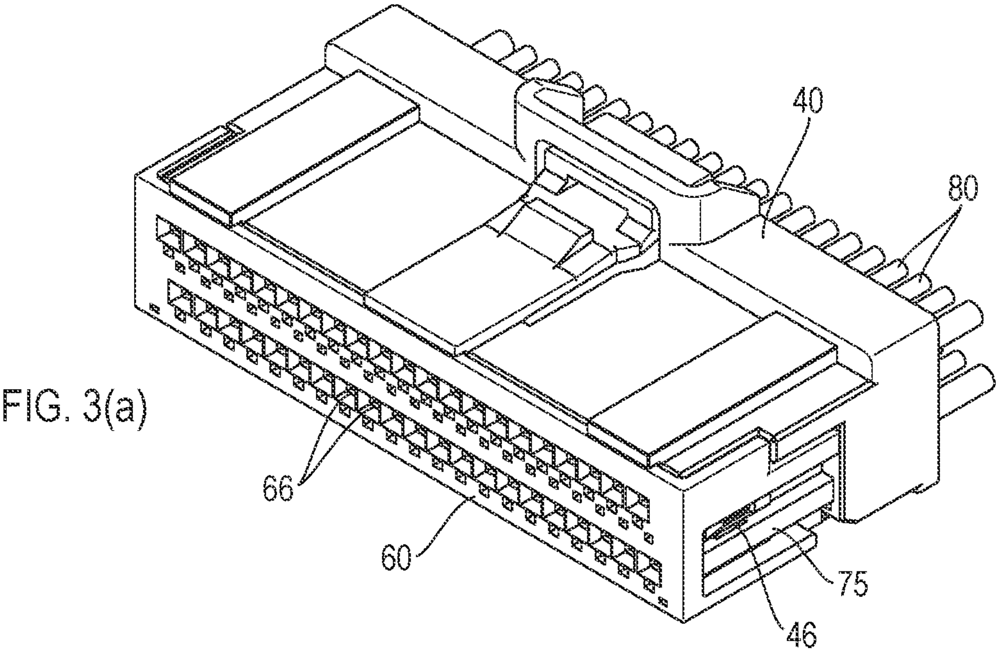
FIG. 3(*a*) is an upper perspective view illustrating an example of a connector according to the present invention, and FIG. 3(*b*) is a lower perspective view illustrating the example of the connector according to the present invention.
Figure 3B:
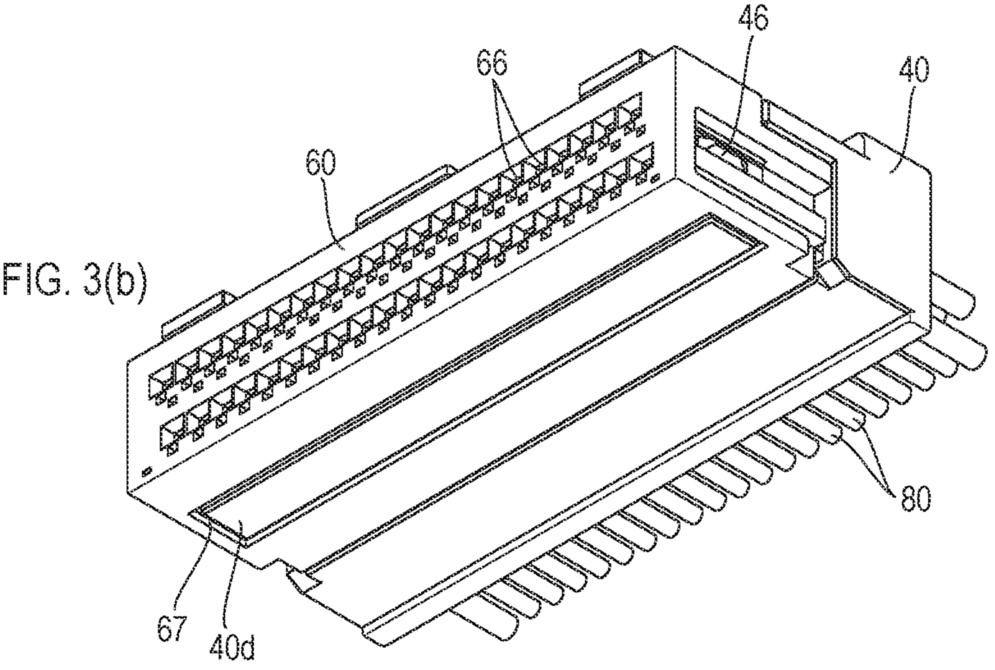
Figure 4:
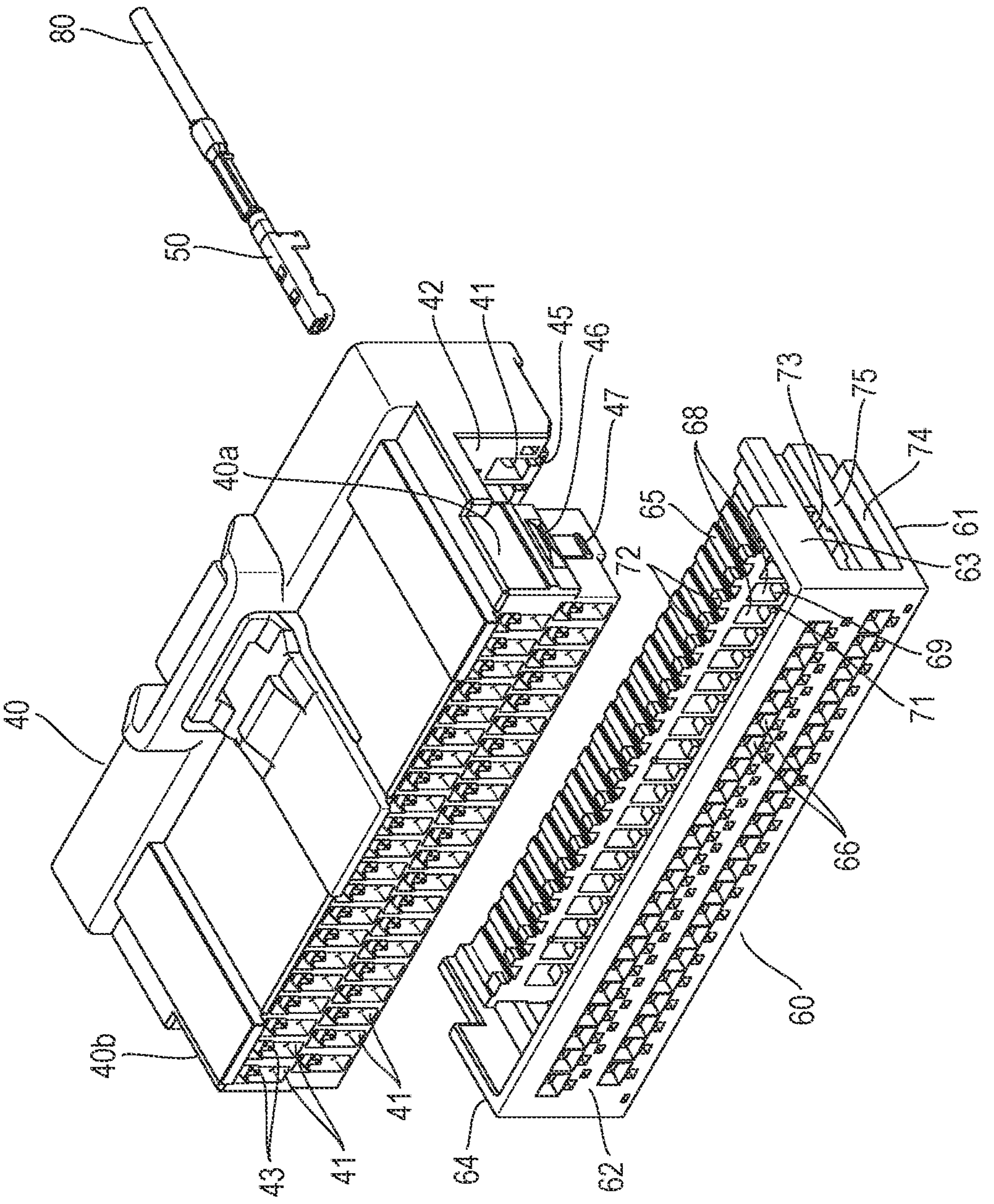
FIG. 4 is an exploded perspective view of the connector illustrated in FIG. 3(*a*), in which illustration of terminals is omitted to show one terminal.
Figure 5:
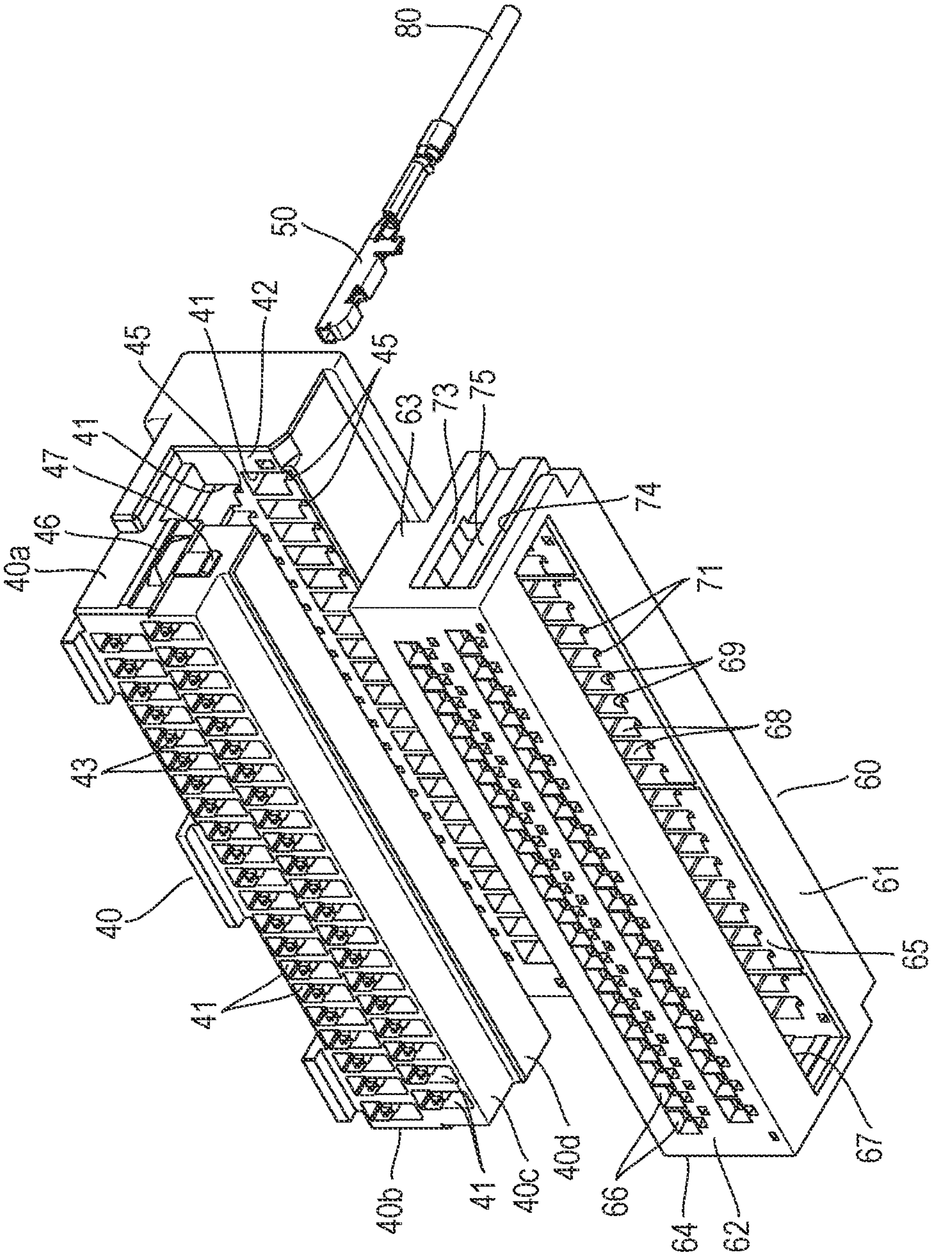
FIG. 5 is an exploded perspective view of the connector illustrated in FIG. 3(*b*), in which illustration of terminals is omitted to show one terminal.

FIG. 3 illustrates an example of a connector according to the present invention. FIGS. 4 and 5 illustrate components of the connector which is illustrated in FIG. 3 in an exploded manner. The connector in this example includes a housing 40 made of resin, a large number of terminals 50, and a retainer 60 made of resin. In FIG. 3, 80 denotes an electric wire connected to the terminal 50. FIGS. 4 and 5 illustrate only one terminal 50 attached to an end of the electric wire 80, omitting illustration of other terminals 50.

The housing 40 has a block shape as illustrated in FIGS. 4 and 5, and a large number of accommodating holes 41 are formed through in a front and rear direction. The accommodating holes 41 are rectangular holes and are formed to be arranged in two rows, which are an upper row and a lower row, forming a staggered pattern in this example. A recessed portion 42 is formed across a lower surface of the housing 40 in a left-right direction (width direction), accordingly dividing each of the accommodating holes 41 into two portions, front and rear portions, with the recessed portion 42 in between.

On upper and lower opposing surfaces of an inner surface on the front end side of each accommodating hole 41, a pressing piece 43 and a protrusion 44 (see FIGS. 9 and 10 described later) are formed. The pressing piece 43 is formed on an upper surface 41*a* of the accommodating hole 41 to cantilever in a manner such that a free end 43*a* protrudes toward a lower surface 41*b*. The free end 43*a* is positioned on the front end of the accommodating hole 41 and a base end is positioned deeper than the front end of the accommodating hole 41. The protrusion 44 is formed on a position, opposed to the base end of the pressing piece 43, on the lower surface 41*b* of the accommodating hole 41 in a manner to protrude toward the upper surface 41*a*. Here, a narrow groove 45 is formed in a corner portion of the lower surface 41*b* of each accommodating hole 41 so as to be extended in an extending direction of the accommodating hole 41. The groove 45 is formed in a manner to be extended from the rear end of the accommodating hole 41 across the recessed portion 42 and be slightly positioned in the accommodating hole 41 which is positioned in front of the recessed portion 42 (see FIG. 10(*a*)).

The front side of the housing 40 is slightly narrower than the rear side, and on both side surfaces 40*a* and 40*b* of this narrower portion, a protrusion portion 46 and a claw 47 are formed in a protruding manner. The protrusion portion 46 and the claw 47 are arranged in an up and down direction and the protrusion portion 46 is positioned above the claw 47. Here, a front half portion 40*c* of the lower surface of the narrower portion of the housing 40 is recessed from a rear half portion 40*d*, that is, the front half portion 40*c* is one step higher than the rear half portion 40*d*.

The retainer 60 is composed of a bottom plate portion 61, a front plate portion 62, both side plate portions 63 and 64, and a rear block portion 65. On the front plate portion 62, a large number of insertion holes 66 are formed in a manner such that the insertion holes 66 are arranged to correspond to the accommodating holes 41 of the housing 40. In the bottom plate portion 61, an opening 67 that is large enough for the rear half portion 40*d* of the lower surface of the narrower portion of the housing 40 to enter is formed. The rear block portion 65 is positioned on the bottom plate portion 61 on the rear side compared to the opening 67 and is shaped to fit into the recessed portion 42 of the housing 40.

A large number of rectangular holes 68 are formed through the rear block portion 65 in the front and rear direction so as to correspond to respective accommodating holes 41 on the lower row in the housing 40, and protrusion portions 69 are formed on front ends on the lower surfaces in respective rectangular holes 68 in a protruding manner. The protrusion portion 69 is formed in a state in which the protrusion portion 69 is coupled with one of both side surfaces of the inside of the rectangular hole 68 but has a slight gap 71 with respect to the other. The gap 71 is positioned on a position corresponding to the narrow groove 45 formed at the accommodating hole 41 of the housing 40.

A large number of protrusion portions 72 are formed on the front end of the upper surface of the rear block portion 65 in a protruding manner so as to correspond to the arrangement of a large number of accommodating holes 41 on the upper row in the housing 40. The protrusion portion 72 is formed so that a left-right width of the protrusion portion 72 is smaller than a left-right width of the accommodating hole 41 and the protrusion portion 72 is positioned on the center in the left-right width of the accommodating hole 41.

On the side plate portions 63 and 64, which are coupled with the front plate portion 62 and the bottom plate portion 61 and are positioned to sandwich the rear block portion 65 from left and right, two cutouts 73 and 74 are formed from the rear ends to the vicinity of the front ends so as to be parallel to each other and be parallel to the bottom plate portion 61. An elongated piece 75 positioned between the cutouts 73 and 74 has a slightly thin plate thickness, an outer surface of the elongated piece 75 is positioned deeper than outer surfaces of the side plate portions 63 and 64, and a claw portion 76 is formed on a lower end of the inner surface so as to protrude inward (see FIG. 11 described later).

Figure 6A:
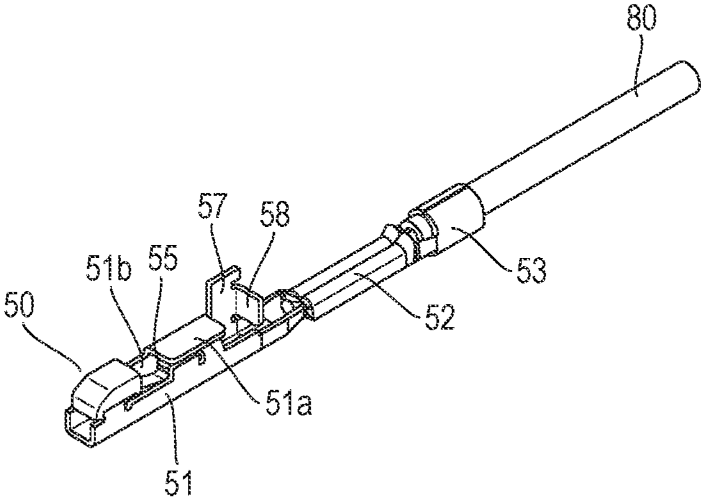
FIG. 6(*a*) is a perspective view illustrating a terminal attached to an end of an electric wire, FIG. 6(*b*) is a lateral view of the same, and FIG. 6(*c*) is a sectional view of the same.
Figure 6B:
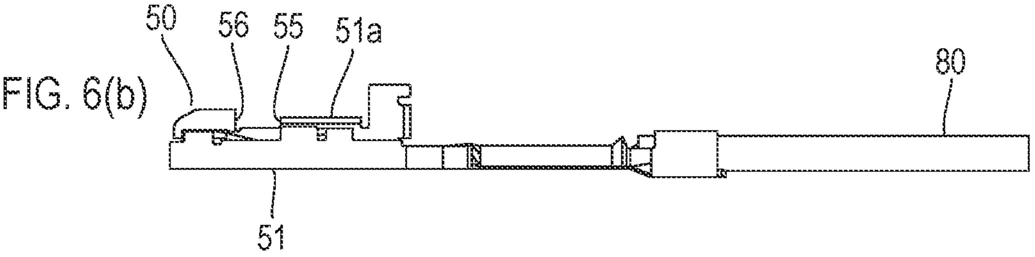
Figure 6C:
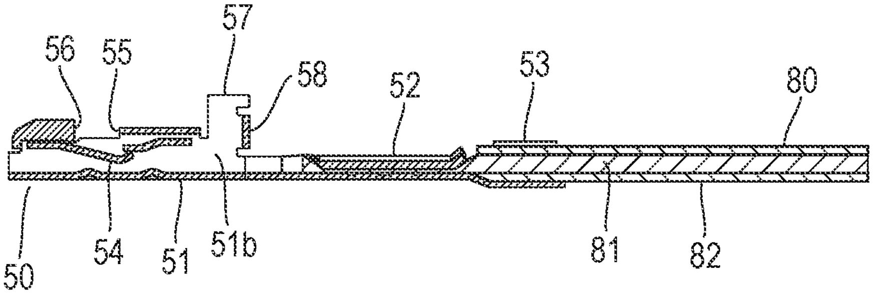

FIG. 6 illustrates the terminal 50 attached to the end of the electric wire 80, and the terminal 50 includes a box-like portion 51, a core wire barrel portion 52, and a covering barrel portion 53. The core wire barrel portion 52 is caulked to a core wire 81 of the electric wire 80 to be connected to the core wire 81, and the covering barrel portion 53 is caulked to a covering 82 of the electric wire 80 to be fixed to the electric wire 80.

The box-like portion 51 is a portion to which a mating terminal (pin terminal) of a mating connector is inserted and connected. A metal plate is bent to form a box-like outer shape of the box-like portion 51 and elastic contact piece 54 that is brought into contact with the mating terminal is formed in the inside. An intermediate portion, in a longitudinal direction (axial center direction of the terminal 50), of an upper plate portion 51*a* constituting an upper surface of the box-like portion 51 is cut out to form a cutout 55, and this cutout 55 forms a step portion 56 on the upper plate portion 51*a*.

On a rear end portion of one side plate portion 51*b* of the box-like portion 51, a guide piece 57 is formed by extending the side plate portion 51*b* upward, and an extended piece 58 is further formed by bending and extending rear ends of the guide piece 57 and the side plate portion 51*b*. The extended piece 58 is positioned to constitute the rear end of the box-like portion 51. Here, an upper end portion of the guide piece 57 is positioned higher than the extended piece 58.

In assembly of the connector, the retainer 60 is first attached to the housing 40 and the terminals 50 to which respective electric wires 80 are connected are subsequently attached. The assembly of the connector will be described below with reference to FIGS. 7 to 11. However, FIGS. 7 to 11 omit the whole illustration of the terminals 50 and the electric wires 80 and illustrate only one terminal 50 to which the electric wire 80 is connected, similarly to FIGS. 4 and 5.

Figure 7A:
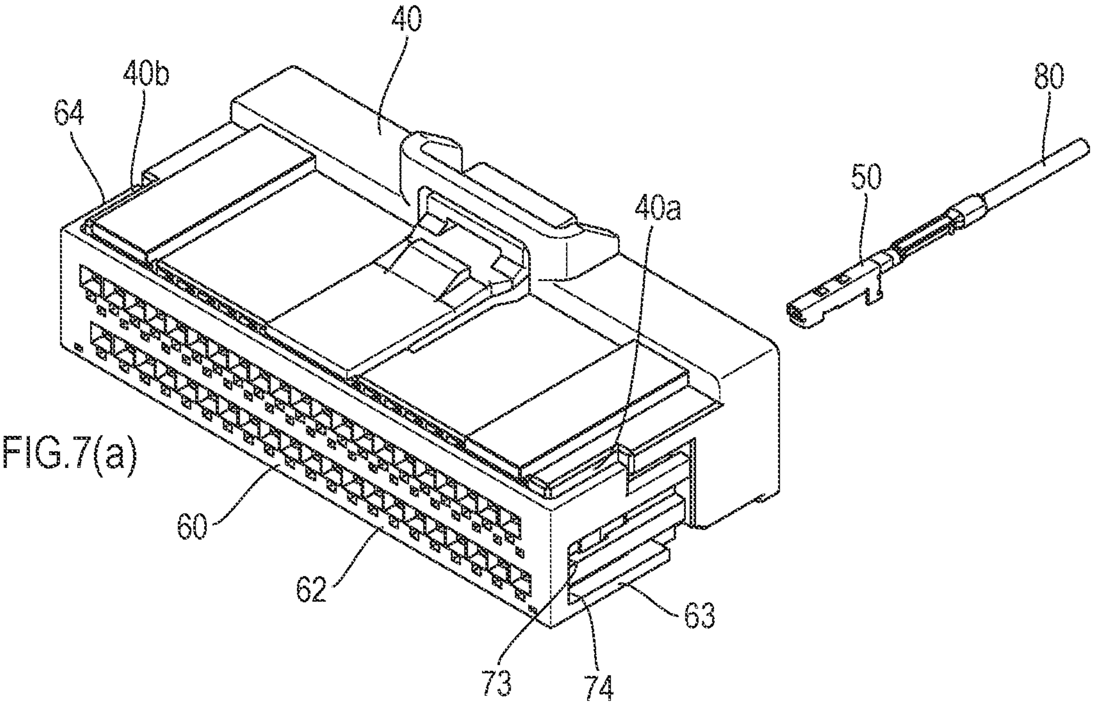
FIG. 7(*a*) is an upper perspective view illustrating a connector before a terminal is attached, and FIG. 7(*b*) is a lower perspective view illustrating the connector before a terminal is attached.
Figure 7B:
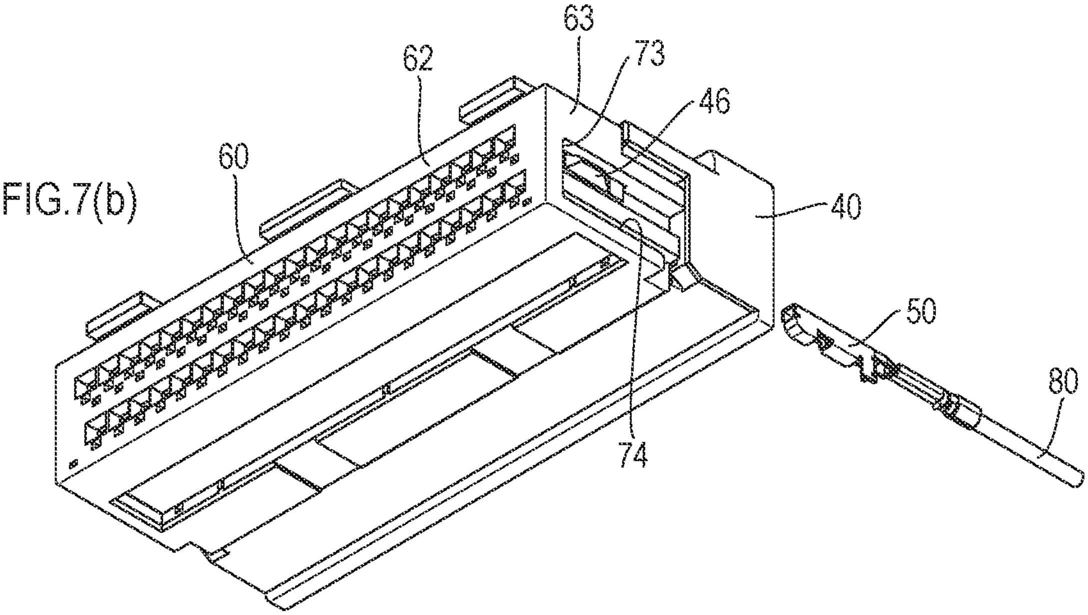

As illustrated in FIG. 7, the retainer 60 is attached to the housing 40. The retainer 60 is attached to the housing 40 from the lower surface side of the housing 40, and the rear block portion 65 of the retainer 60 is inserted into the recessed portion 42 of the housing 40 (see FIGS. 9 and 10). The front plate portion 62 of the retainer 60 is positioned so as to cover the front surface of the housing 40. In this state, the protrusion portions 46, which are formed on the respective side surfaces 40*a* and 40*b* of the housing 40, enter to be positioned in respective cutouts 73, which are positioned upper side, of the cutouts 73 and 74, which are formed on each of the side plate portions 63 and 64 of the retainer 60. The side plate portions 63 and 64 are thus caught by the protrusion portions 46 and accordingly, the retainer 60 is retained and positioned in the housing 40 (see FIGS. 11(*a*) and 11(*b*)).

Figure 8:
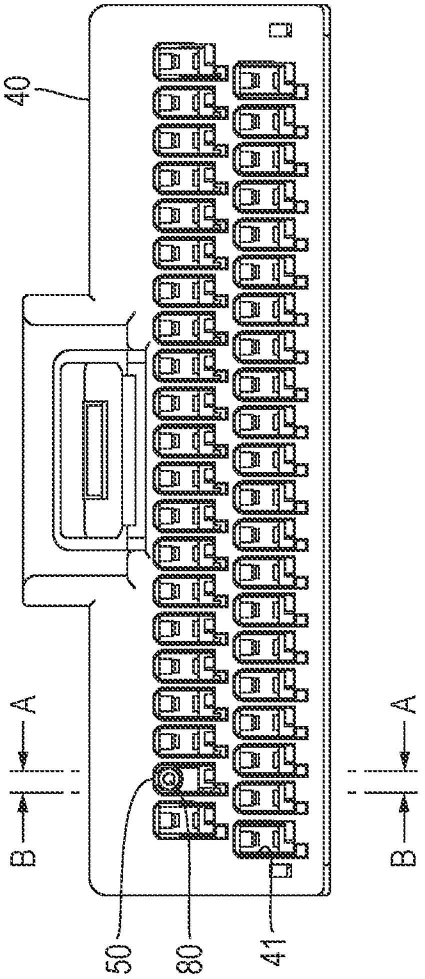
FIG. 8 is a rear view of the connector in the middle of terminal insertion, in which illustration of terminals is omitted to show one terminal.
Figures 9A, 9B, 9C:
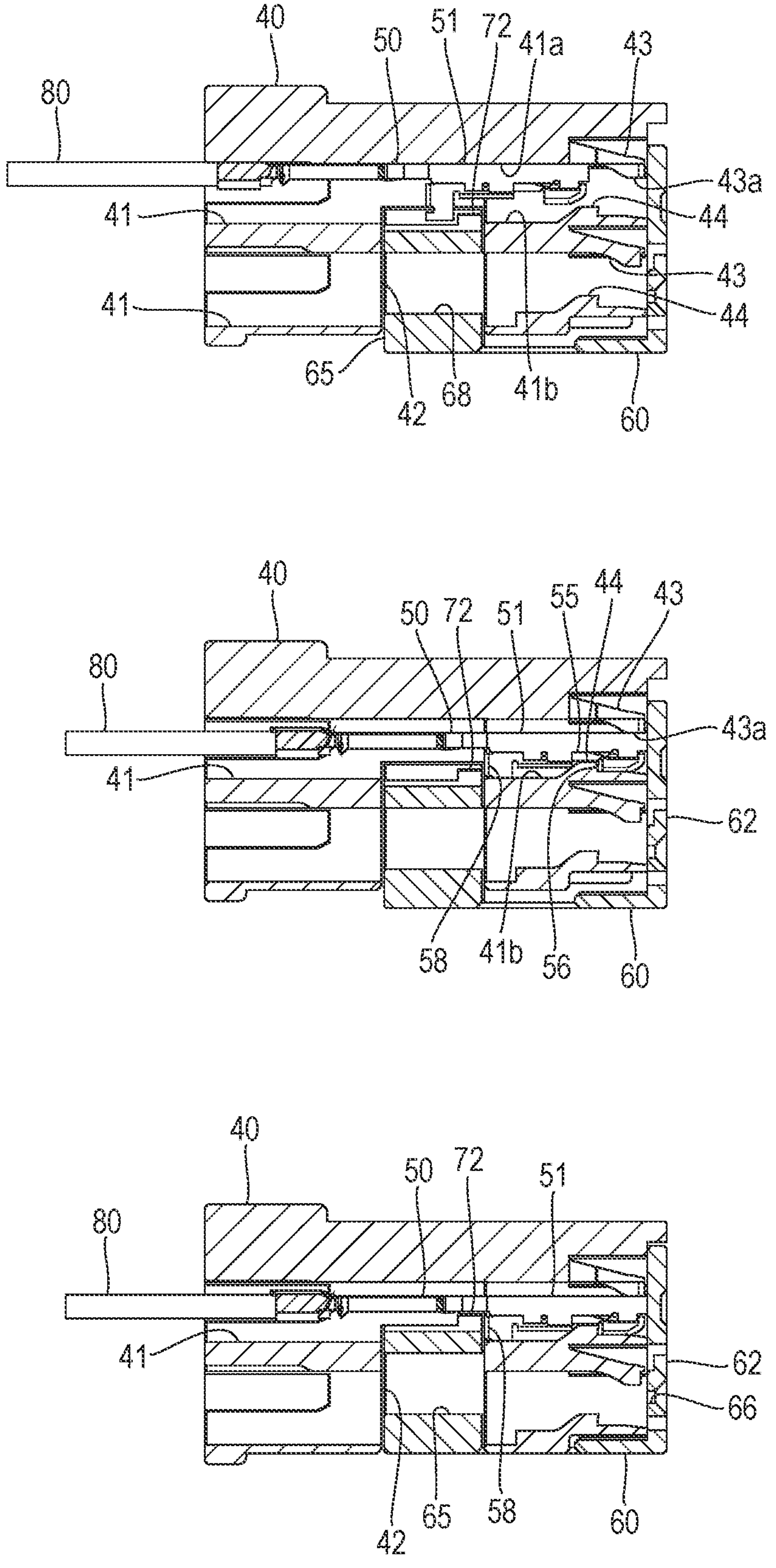
FIG. 9(*a*) is a sectional view taken along an A-A line of FIG. 8 and illustrating the middle of terminal insertion, FIG. 9(*b*) is a sectional view taken along the A-A line of FIG. 8 and illustrating a primary locking state of the terminal, and FIG. 9(*c*) is a sectional view taken along the A-A line of FIG. 8 and illustrating a secondary locking state of the terminal.
Figures 10A, 10B, 10C:
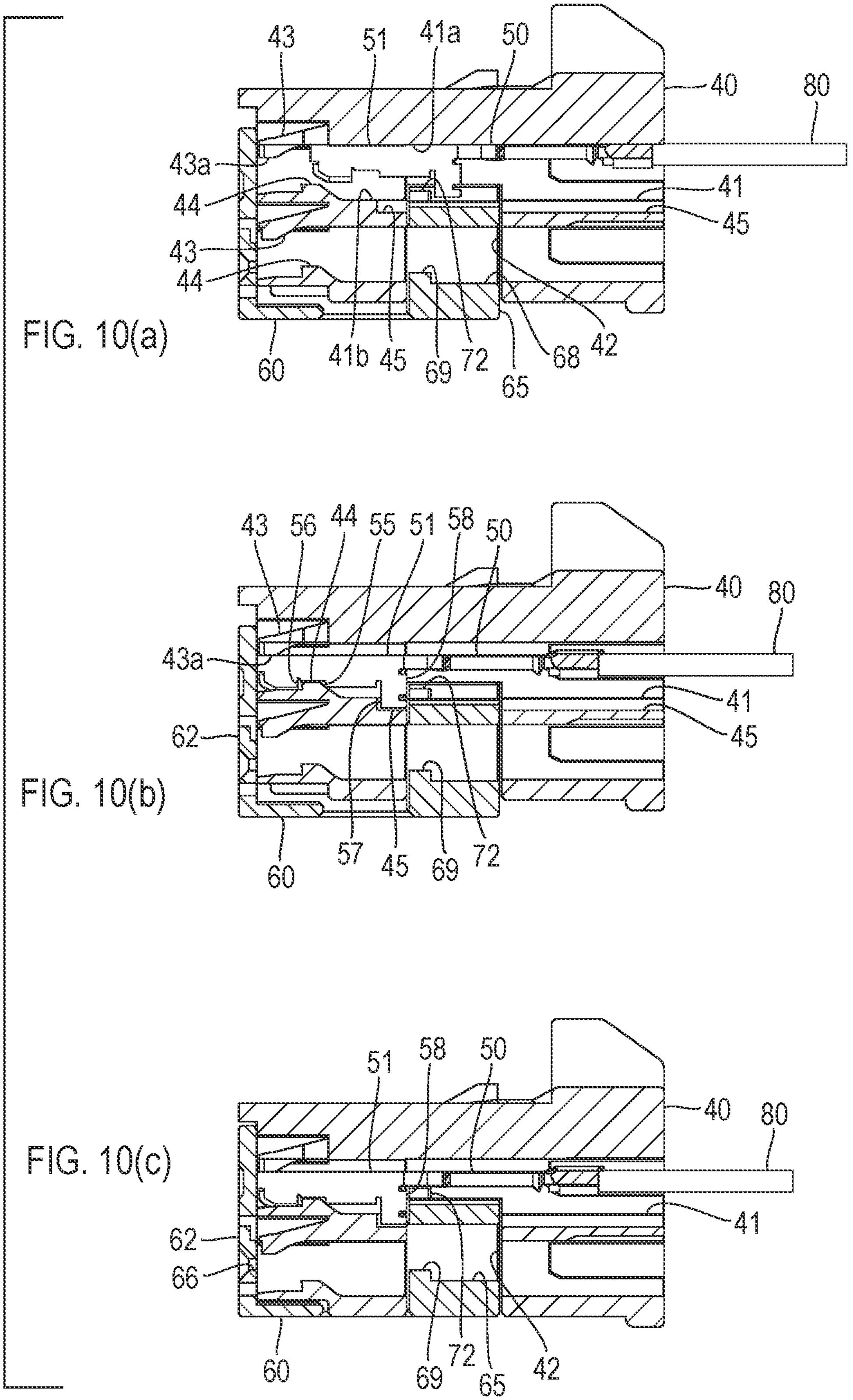
FIG. 10(*a*) is a sectional view taken along a B-B line of FIG. 8 and illustrating the middle of terminal insertion, FIG. 10(*b*) is a sectional view taken along the B-B line of FIG. 8 and illustrating a primary locking state of the terminal, and FIG. 10(*c*) is a sectional view taken along the B-B line of FIG. 8 and illustrating a secondary locking state of the terminal.

FIGS. 9(*a*) to 9(*c*) illustrate a process in which the terminal 50 is inserted and accommodated into the accommodating hole 41 of the housing to be in the secondary locking state, with an A-A cross section of FIG. 8, and FIGS. 10(*a*) to 10(*c*) illustrate the same process as that of FIGS. 9(*a*) to 9(*c*) with a B-B cross section of FIG. 8. The description will be provided below in sequence.

<FIG. 9(*a*), FIG. 10(*a*)>

Figures 11A, 11B, 11C, 11D:
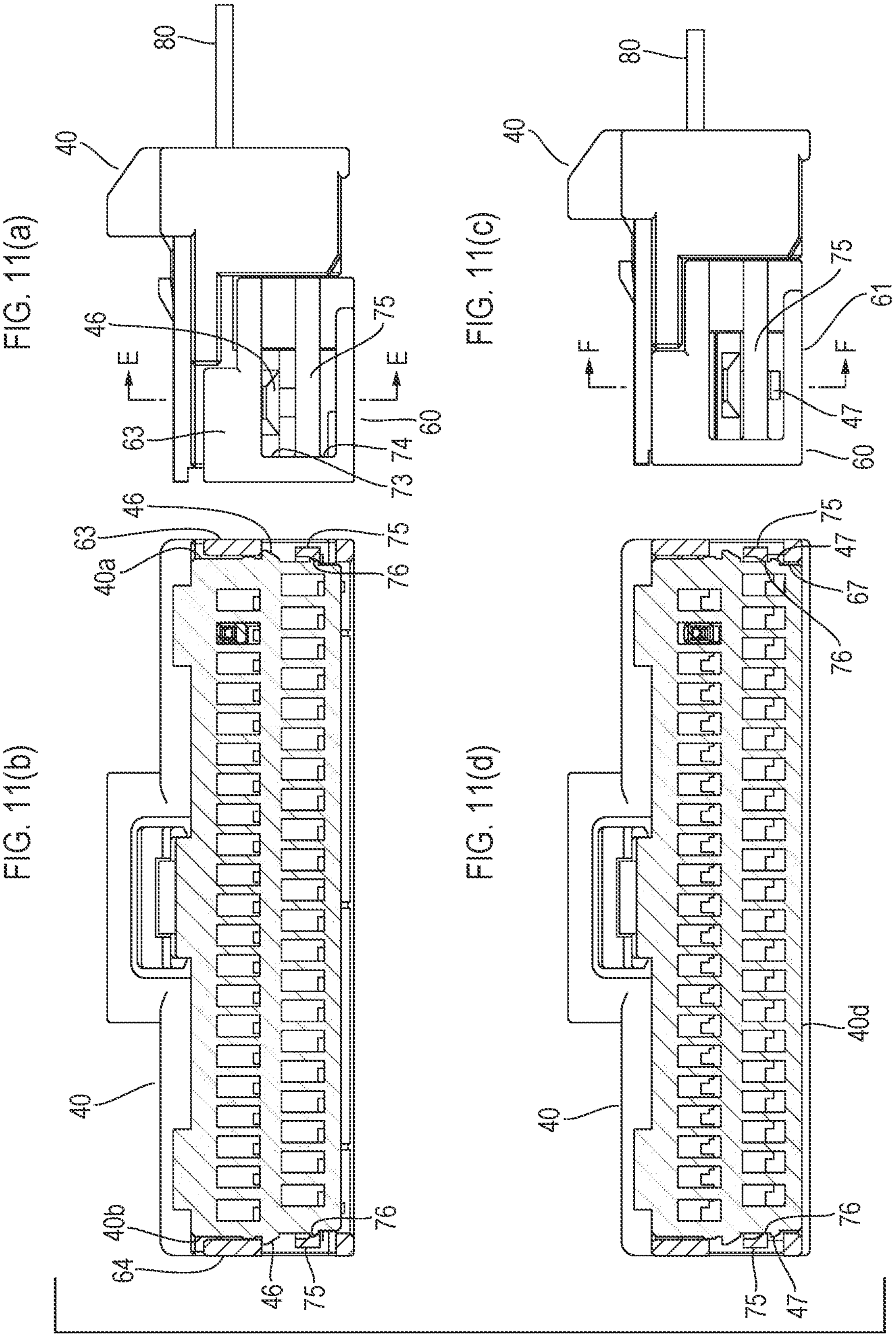
FIG. 11(*a*) is a lateral view of the connector in the state illustrated in FIG. 10(*a*), FIG. 11(*b*) is a sectional view taken along an E-E line of FIG. 11(*a*), FIG. 11(*c*) is a lateral view of the connector in the state illustrated in FIG. 10(*c*), and FIG. 11(*d*) is a sectional view taken along an F-F line of FIG. 11(*c*).

The state illustrated is a state in which the retainer 60 is positioned on the position illustrated in FIG. 7 and FIGS. 11(*a*) and 11(*b*), that is, a state in which the retainer 60 is positioned on a first position. Namely, the state is the middle of insertion after inserting the box-like portion 51 of the terminal 50 into the accommodating hole 41 from the rear end of the housing 40. The retainer 60 is positioned on the first position and is retracted. Accordingly, the retainer 60 does not interfere with the insertion of the box-like portion 51. In more detail, the protrusion portion 72 (69) formed on the retainer 60 does not interfere with the insertion of the box-like portion 51.

<FIG. 9(*b*), FIG. 10(*b*)>

The state illustrated is a state in which the box-like portion 51 is further inserted to be abutted on the front plate portion 62 of the retainer 60. The box-like portion 51 is pushed by the free end 43*a* of the pressing piece 43, which is formed on the accommodating hole 41 in a protruding manner, and is displaced in a direction crossing with the insertion direction (in this example, a direction orthogonal to the insertion direction and to the lower side), and the protrusion 44, which is formed on the accommodating hole 41 in a protruding manner, enters the cutout 55 formed in the box-like portion 51. The opposing surface of the box-like portion 51, which is opposed to the lower surface 41*b* on which the protrusion 44 is formed in the accommodating hole 41, is pressed onto the lower surface 41*b*. Accordingly, the step portion 56 of the box-like portion 51 is caught by the protrusion 44 and retained. Here, the guide piece 57 formed on the box-like portion 51 enters the groove 45 formed at the accommodating hole 41.

Further, because of the displacement of the box-like portion 51, the protrusion portion 72 (69) of the retainer 60, which protrudes on extension of the accommodating hole 41, is positioned on the rear end of the box-like portion 51, that is, positioned behind the extended piece 58 of the box-like portion 51. Thus, the rear end of the box-like portion 51 is caught by the protrusion portion 72 (69) of the retainer 60, which also retains the box-like portion 51.

When the terminal 50 is thus inserted into the accommodating hole 41 and accommodation of the box-like portion 51 of the terminal 50 into the accommodating hole 41 is completed and the terminal 50 is in the primary locking state, the box-like portion 51 is doubly retained in this example. The guide piece 57 of the box-like portion 51 that enters the groove 45 is caught at the front surface of the rear block portion 65 of the retainer 60, functioning as a stopper.

<FIG. 9(*c*), FIG. 10(*c*)>

The retainer 60 attached to the housing 40 is displaceable in a direction crossing with the insertion direction of the box-like portion 51 with respect to the accommodating hole 41 (in this example, the direction orthogonal to the insertion direction and the up and down direction), and the state illustrated is a state in which the retainer 60 is displaced from the first position to the second position by further pushing the retainer 60 into the housing 40.

The displacement of the retainer 60 mentioned above increases a range in which the protrusion portion 72 (69) of the retainer 60 is positioned to overlap with the rear end of the box-like portion 51 of the terminal 50, that is, the hooking between the protrusion portion 72 (69) of the retainer 60 and the rear end of the box-like portion 51 is increased, and the terminal 50 is finally locked, that is, the terminal 50 is in the secondary locking state.

FIGS. 11(*c*) and 11(*d*) illustrate a state in which the retainer 60 is displaced to the second position. The claw portion 76 formed on the inner surface of the elongated piece 75 of the retainer 60 climbs over the claw 47 formed on the housing 40 to be positioned above the claw 47. Thus, the retainer 60 is retained and positioned on the second position. The rear half portion 40*d* of the lower surface of the narrower portion of the housing 40 is fitted into the opening 67 of the bottom plate portion 61 of the retainer 60. The insertion hole 66 formed on the front plate portion 62 of the retainer 60 is positioned on a position corresponding to the front end opening of the box-like portion 51 of the terminal 50, enabling insertion of a mating terminal into the box-like portion 51.

According to the above-described example of the connector of the present invention, the box-like portion 51 is pushed by the pressing piece 43 of the housing 40 and pressed against the inner surface (lower surface 41*b*) of the accommodating hole 41 in the primary locking state, whereby the terminal 50 maintains a stable posture without rattling. In addition, the step portion 56 and the rear end (extended piece 58) of the box-like portion 51 are caught by the protrusion 44 of the housing 40 and the protrusion portion 72 (69) of the retainer 60 respectively and thus the terminal 50 is retained. That is, the terminal 50 is doubly locked and retained.

Thus, the primary locking state of the terminal 50 is more stabilized than related art and the holding force in the primary locking of the terminal 50 can be increased. Accordingly, even when, for example, the electric wire 80 connected to the terminal 50 is pulled in the primary locking state, the terminal 50 can be prevented from coming off.

Figures 12A, 12B:
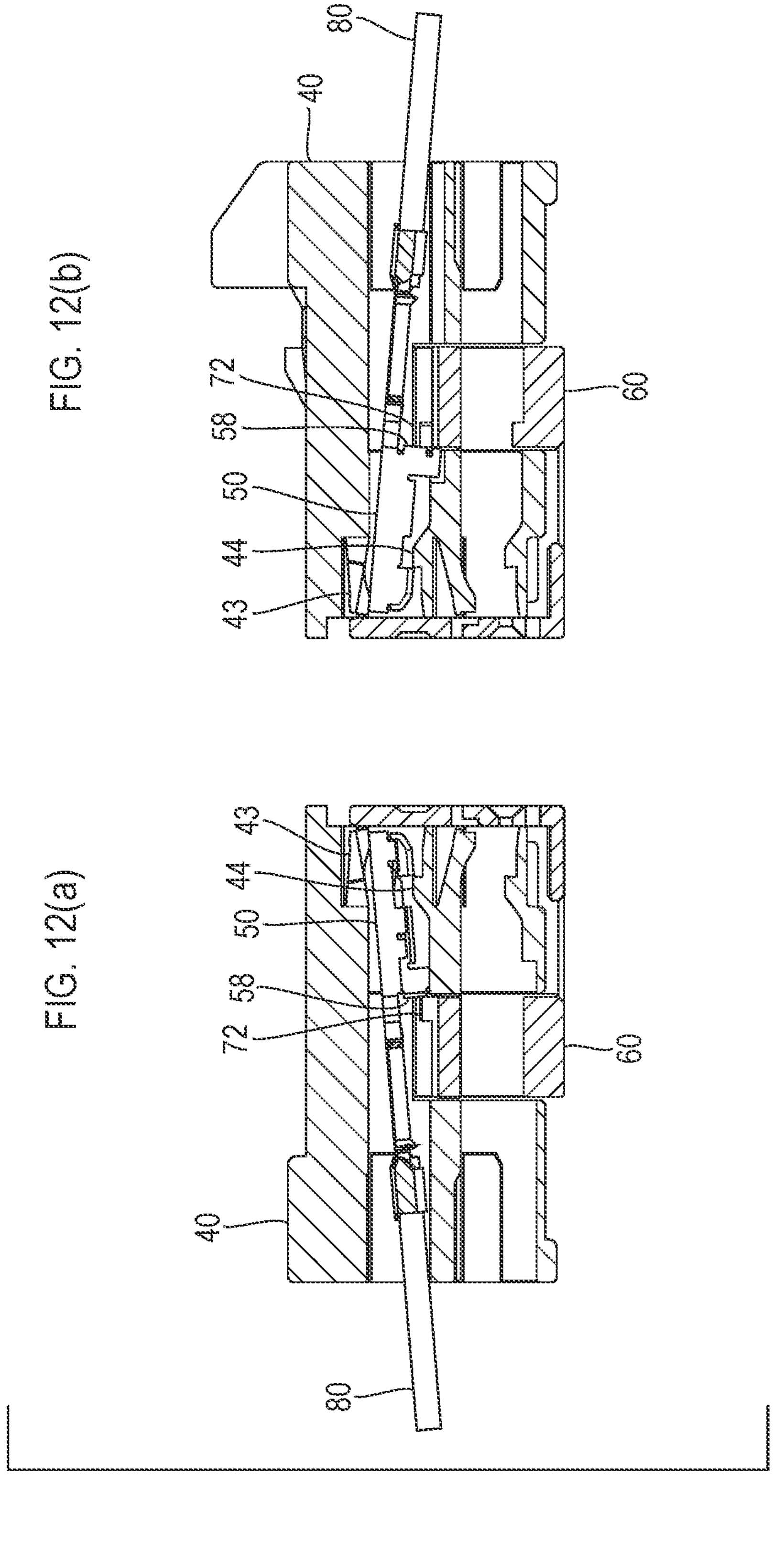
FIG. 12(*a*) is a sectional view illustrating a state in which the electric wire is swayed downward and the terminal is tilted on the section illustrated in FIG. 9(*b*), and FIG. 12(*b*) is a sectional view illustrating a state in which the electric wire is swayed downward and the terminal is tilted on the section illustrated in FIG. 10(*b*).
Figures 13A, 13B:
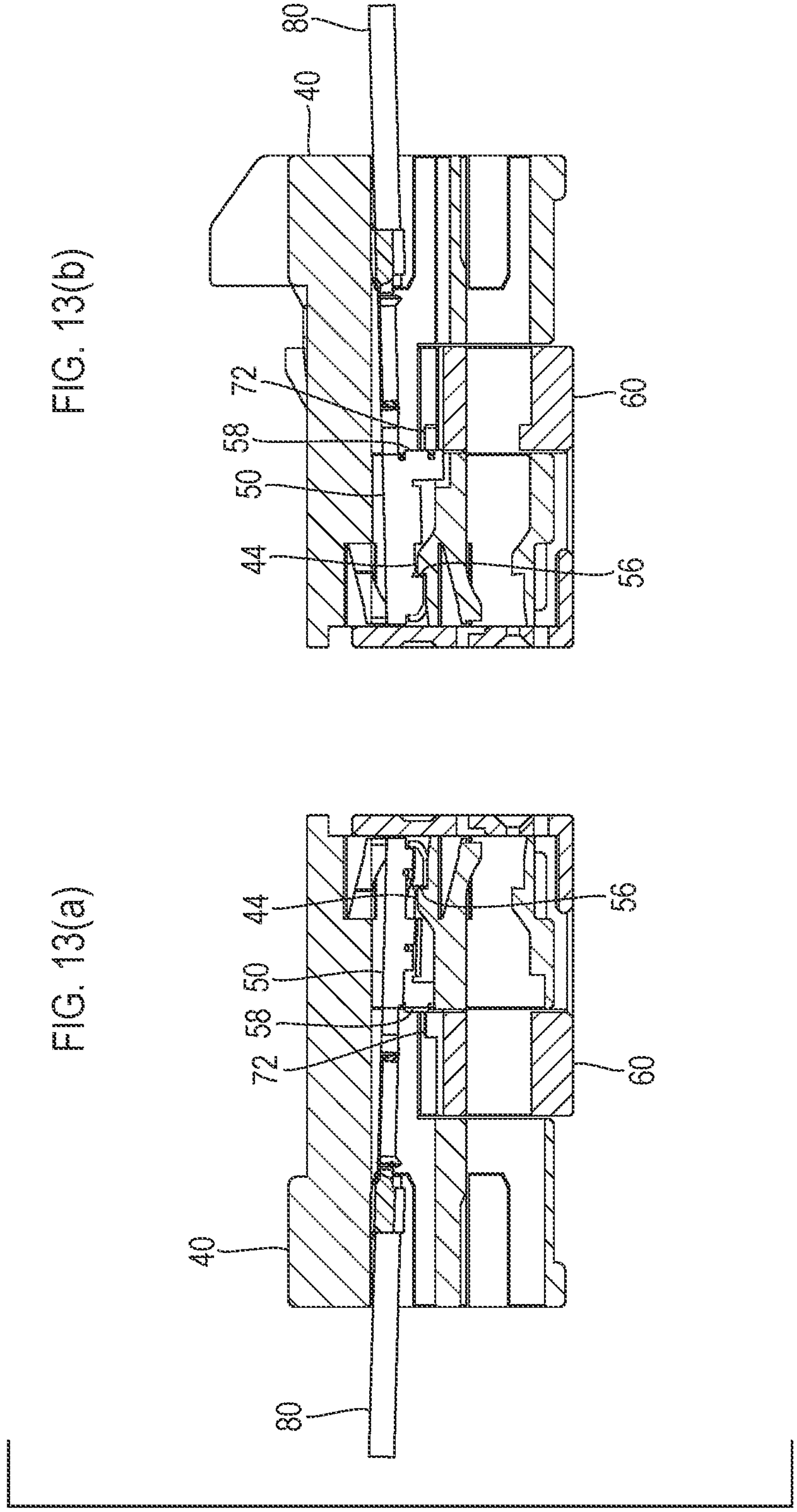
FIG. 13(*a*) is a sectional view illustrating a state in which the electric wire is swayed upward and the terminal is tilted on the section illustrated in FIG. 9(*b*), and FIG. 13(*b*) is a sectional view illustrating a state in which the electric wire is swayed upward and the terminal is tilted on the section illustrated in FIG. 10(*b*).

In addition, the box-like portion 51 of the terminal 50 is locked at two points, as described above. Therefore, even when, for example, the electric wire 80 is swayed and a force which is strong enough to tilt the terminal 50 is applied to the terminal 50, the terminal 50 can be prevented from coming off. FIGS. 12 and 13 illustrate such a state. FIG. 12 illustrates a state in which locking is maintained by the protrusion portion 72 of the retainer 60 even when the electric wire 80 is swayed downward and the locking by the protrusion 44 is almost released. FIG. 13 illustrates a state in which locking is maintained by the protrusion 44 of the housing 40 even when the electric wire 80 is swayed upward and the locking by the protrusion portion 72 of the retainer 60 is almost released.

The foregoing description of the embodiment of the invention has been presented for the purpose of illustration and description. It is not intended to be exhaustive and to limit the invention to the precise form disclosed. Modifications or variations are possible in light of the above teaching. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A connector comprising:

a terminal that includes a box-like portion, into which a mating terminal is inserted and connected, and is attached to an end of an electric wire;

a housing that has an accommodating hole accommodating the box-like portion; and a retainer that is attached to the housing in a manner to be displaceable in a crossing direction, the crossing direction crossing with a direction in which the box-like portion is inserted into the accommodating hole, and can be positioned on a first position and a second position, wherein when mutually-opposing inner surfaces of the accommodating hole are defined as an upper surface and a lower surface, a pressing piece is formed on the upper surface, the pressing piece cantilevering to protrude toward the lower surface, and a protrusion is formed on the lower surface, the protrusion protruding toward the upper surface, the retainer includes a protrusion portion that protrudes on extension of the accommodating hole, when the retainer is positioned on the first position, the box-like portion is allowed to be inserted into the accommodating hole without displacement of the retainer and the box-like portion inserted in the accommodating hole is pushed by the pressing piece and displaced in the crossing direction so as to make a step portion, the step portion being formed on the box-like portion, be caught by the protrusion and retained and a rear end of the box-like portion be caught by the protrusion portion and retained, where a primary locking state is produced, and the retainer is displaced from the first position to the second position so as to increase hooking between the protrusion portion and the rear end of the box-like portion, where a secondary locking state is produced.

2. The connector according to claim 1, wherein an opposing surface, the opposing surface being opposed to the lower surface of the accommodating hole, of the box-like portion is pressed onto the lower surface in response to displacement of the box-like portion in the crossing direction.

3. The connector according to claim 1, wherein a free end, the free end pushing the box-like portion, of the pressing piece is positioned on a front end side of the accommodating hole and the protrusion is positioned on a rear end side of the accommodating hole compared to the free end.

4. The connector according to claim 2, wherein a free end, the free end pushing the box-like portion, of the pressing piece is positioned on a front end side of the accommodating hole and the protrusion is positioned on a rear end side of the accommodating hole compared to the free end.

* * * * *